March 1, 1966  F. M. WOOD  3,237,446
SELECTIVE DEFECT DETECTION AND THICKNESS
MEASURING METHOD AND APPARATUS
Filed April 24, 1964  4 Sheets-Sheet 1
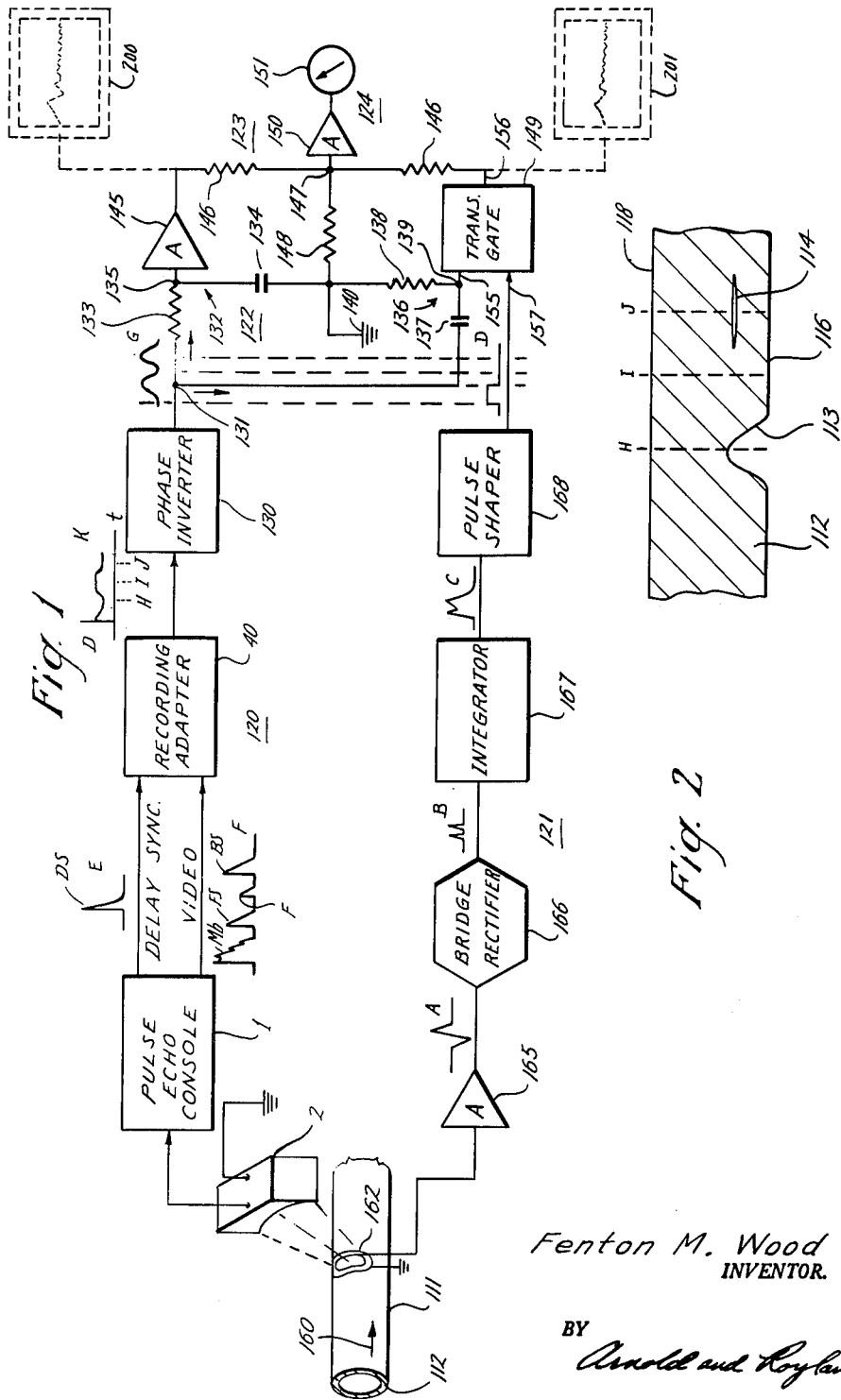
Fenton M. Wood
INVENTOR.
BY
Arnold and Roylance
ATTORNEYS March 1, 1966 F. M. WOOD 3,237,446
SELECTIVE DEFECT DETECTION AND THICKNESS
MEASURING METHOD AND APPARATUS
Filed April 24, 1964 4 Sheets-Sheet 2
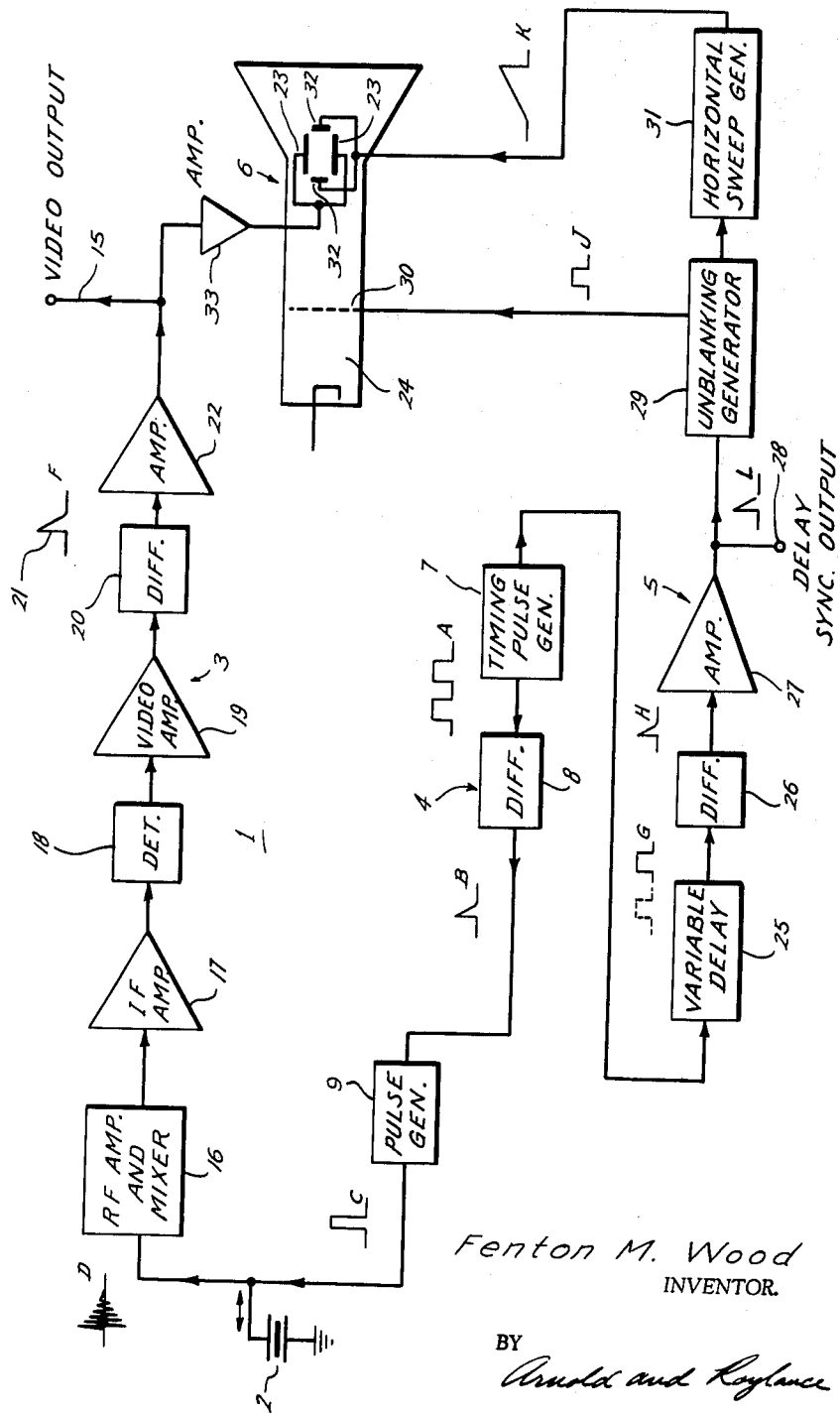
Fenton M. Wood
INVENTOR.
BY Arnold and Roylance
ATTORNEYS

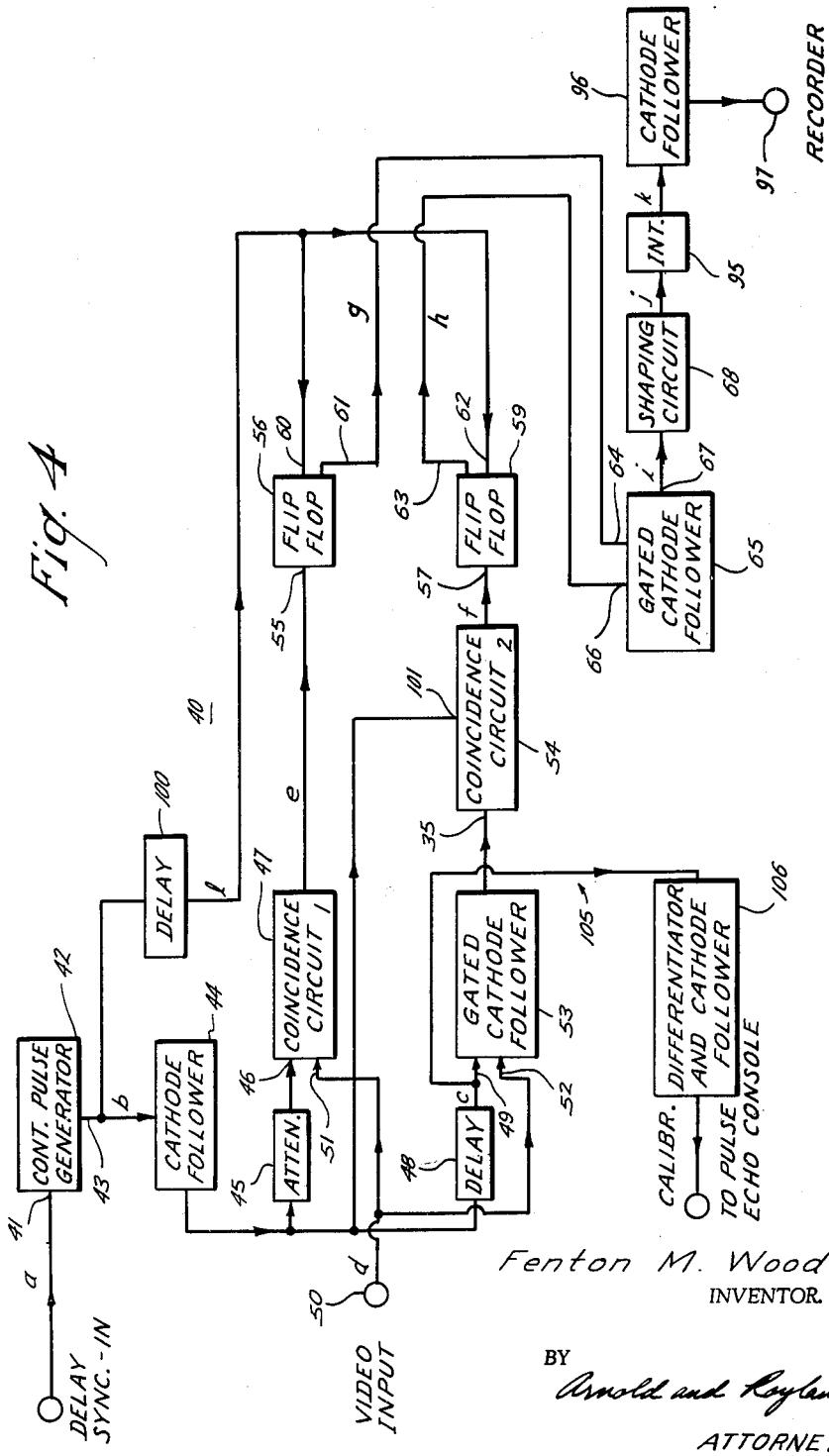

a DELAY SYNC.
b CONT. PULSE GEN.
c DELAYED CONT. PULSE
d VIDEO PULSE TRAIN
e COINCID. 47
f COINCID 54
g FLIP-FLOP (FF) 56
h FLIP-FLOP (FF) 59
i GATED CATH. FOL.
j PULSE SHAPER
k INTEGRATOR
l RESET PULSE

Fenton M. Wood
INVENTOR.

BY Arnold and Roylance
ATTORNEYS

United States Patent Office 3,237,446
Patented Mar. 1, 1966

3,237,446
SELECTIVE DEFECT DETECTION AND THICKNESS MEASURING METHOD AND APPARATUS
Fenton M. Wood, Sugarland, Tex., assignor to American Machine & Foundry Company, New York, N.Y., a corporation of New Jersey
Filed Apr. 24, 1964, Ser. No. 362,514
13 Claims. (Cl. 73—67.9)

This application is a continuation-in-part of copending application Serial Number 172,526, filed February 12, 1962, by the same inventor.

This invention is concerned broadly with the location of anomalies in test objects or other parts and more specifically with the selection of anomalies having predetermined characteristics.

In some test situations, it is desirable to detect every anomaly in the test object. Often, however, anomalies of different types may appear in the test object, and only certain of these types are of interest in the course of inspection. For instance, the object may be susceptible to flaws of various types, some of which are serious and constitute a reason for rejection of the part, and others which are relatively innocuous and do not interfere with proper operation of the part. The former of course must be detected; the latter it is desirable to ignore.

It is the broad object of this invention to provide a method of and apparatus for selectively detecting anomalies in a test object in accordance with certain preselected characteristics, so that only these anomalies having the desired characteristics are indicated.

While this invention has broad application, it is particularly valuable for testing drill pipe. There are several types of flaws common in drill pipe: pits on the inner or outer surfaces of the pipe wall, and laminations and inclusions within the pipe wall. Laminations and inclusions are usually acceptable flaws; that is, they do not weaken the drill pipe sufficiently to provide cause for rejection. Pits, on the other hand, if they are sufficiently deep, are a common cause of structural damage during subsequent manipulation of a drill pipe, and therefore pipe in which pitting exceeds a certain depth should not be reused. It would be desirable, therefore, in testing drill pipe, if the testing apparatus ignored laminations and inclusions but indicated the existence of pits and their depth.

It is therefore another object of this invention to provide a method of an apparatus for inspecting drill pipe and the like, which method and apparatus provide indications of the existence of and depth of pits in the inner and outer pipe walls, but do not provide an indication of laminations and inclusions.

Pits may be distinguished from inclusions and laminations by their dimensional orientation. Both laminations and inclusions are so dimensioned and oriented that they have a relatively small area in the radial direction; that is, a section taken through a lamination or inclusion perpendicular to the pipe axis would show a very small area. For a pit, however, there would be a relatively large area in the radial direction visible in such a section. It is this difference in dimensional orientation between the two types of flaws which is used in this invention to distinguish between them.

It is therefore still another object of this invention to provide a method of and apparatus for inspecting a test object which selectively distinguishes between anomalies having different dimensional orientations.

The manner in which the inventive method and apparatus achieve the above and other objectives may be more clearly understood by reference to the following detailed description of the method and apparatus, taken in conjunction with the drawings, which form a part of the specification, and in which:

FIG. 1 illustrates, partially in block diagram and partially in schematic form, a preferred embodiment of the apparatus of this invention;

FIG. 2 is a fragmentary longitudinal section through a portion of pipe wall, illustrating typical types of flaws as they appear therein;

FIG. 3 is a detailed block diagram of the pulse echo console portion of the apparatus of FIG. 1;

FIG. 4 is a detailed block diagram of the recording adapter of the apparatus of FIG. 1;

Figure 5:
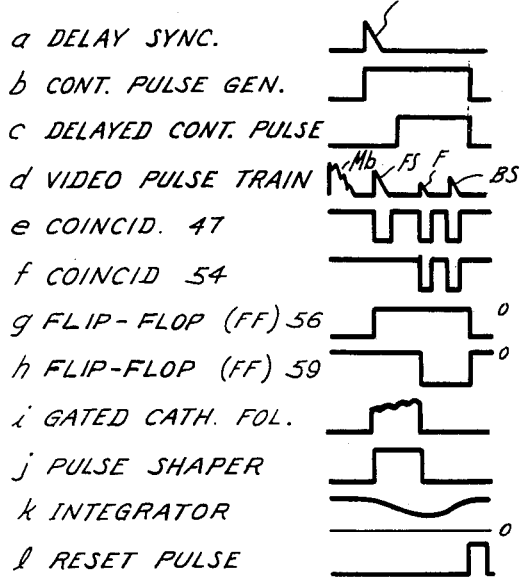
FIG. 5 shows the waveforms at various points in the recording adapter with reference to the block diagram of FIG. 4.

In FIG. 1 there is shown a portion of drill pipe 111 having a cylindrical wall 112. Cylindrical wall 112 has inner and outer surfaces 116 and 118, respectively, as indicated on the fragmentary section of FIG. 2. FIG. 2 also shows two common types of flaws appearing in a drill pipe: a pit 113 appearing on inner surface 116 of wall 112; and an inclusion 114 located entirely within wall 112. What is wanted is information as to the location and depth of any pits in pipe wall 112, ignoring any inclusions. To do this, use is made of the fact that pits have a relatively large dimension in a radial direction, whereas inclusions (and also laminations, which it is also desirable to ignore) do not.

In the preferred inventive method, the pipe is inspected magnetically and ultrasonically. Longitudinal D.C. magnetization, as indicated by arrow 160 in FIG. 1, is set up in pipe 111. The resulting longitudinally directed lines of flux are substantially deflected by mechanical anomalies, such as flaw 113, that have a relatively large dimension in the radial direction; but the lines of flux are not substantially deflected by anomalies, such as inclusion 114 or laminations, that do not have a substantial dimension in the radial direction. A magnetic detecting device is passed along the outer surface 118 of pipe wall 112. It picks up lines of flux deflected toward surface 118 by pit 113, and therefore provides an indication of the existence of such a pit; however, it does not provide an indication of the existence of an inclusion 114, since the inclusion does not deflect a substantial number of lines of flux toward outer surface 118.

The pipe is also inspected by an ultrasonic inspection system which beams ultrasonic energy radially through outer surface 118 into pipe wall 112 and detects the ultrasonic energy reflected from either inner surface 116 or a flaw in the wall. The ultrasonic inspection system is responsive to all mechanical flaws in wall 112 that have a substantial longitudinal or transverse direction, and through a measurement of the elapsed time required for the return of the reflected energy also yields information as to the depth of each flow in wall 112. Thus it would indicate the depth of a pit in either the inner or outer walls, or the location wall of an inclusion or lamination.

The results of the magnetic inspection provide information as to the existence of the particular type or types of flaws of interest, but do not provide the required information about those flaws; the results of the ultrasonic inspection provide the necessary information about each flaw in the pipe, but do not differentiate between types of flaws. By combining the results of both inspections, that is, by recording or indicating depth information from the results of the ultrasonic inspection only as to those flaws which results of the magnetic inspection indicate as being of the particular type or types of flaws of interest, the desired selective depth information is obtained for only those flaws that are apt to be dangerous if the pipe is to be used.

In practicing this inventive method, it is possible to make each inspection separately and record the data, and then subsequently to compare the data recorded from each separate inspection and compile the desired information. The preferred method, however, is to conduct both examinations simultaneously by having both the magnetic and ultrasonic transducers interrogate the same portion of a pipe at the same time and by moving these transducers in synchronism along the outer surface of the pipe. In this way, a comparison of the outputs of both inspection systems may be made instantaneously, and the system lends itself to automatic comparison by correlation equipment.

The preferred embodiment of the apparatus is found in FIG. 1, and in more detail in the subsequent figures, and it comprises basically an ultrasonic inspection system 120, a magnetic inspection system 121, and a signal separation circuit 122, a load circuit 123, and an indicator circuit 124. It is helpful to an understanding of the system operation to ignore for the time being the detailed operation of the circuitry of the rather sophisticated ultrasonic system 120. Ultrasonic transducer 2, forming a part of the ultrasonic inspection system 120, is arranged to interrogate the same region of pipe 111 to which magnetic detecting coil 162 is responsive. These two transducing elements are moved by means not shown in synchronism along the outer surface 118 of pipe wall 112, always interrogating and being receptive to the same region of pipe wall.

Without considering the detailed operation of the ultrasonic system, suffice it to say at this point that it produces, from an inspection of a portion of pipe 111 whose fragmentary section is shown in FIG. 2, a waveform as shown at 1(K). By measuring the reflected return of transmitted ultrasonic energy and suitably operating upon the resulting returned signal, it provides a waveform in which pit 113, shown at dashed line H in FIG. 2, provides a corresponding dip, shown at dashed line H in waveform 1(K). Inclusion 114, located at dashed line J in FIG. 2, produces a corresponding dip at dashed line J in waveform 1(K). The flaw-free area between these two flaws, as represented by dashed line I in FIG. 2, produces the horizontal flat waveform portion opposite dashed line I in FIG. 1(K). The distance from the bottom of each of the flaw-indicating dips in waveform 1(K) to a reference base line indicates the depth of the corresponding flaw in pipe wall 112, while the distance of the flat waveform portion opposite dashed line I to the same base line provides a measure of the thickness of wall 112.

Obviously, waveform 1(K) is illustrative; a realistic waveform would be comprised almost exclusively of the flat horizontal portion with only an occasional dip to indicate a flaw. It is obvious that this flat portion, indicating the wall thickness of the pipe, is either constant or, should the wall thickness vary slightly, varies in amplitude at a very slow rate, and is therefore substantially D.C. in nature. The flaw-indicating dips, on the other hand, are of a higher frequency than the slow variation in wall thickness. Output waveform 1(K) then [after inversion in phase inverter 130 to provide waveform 1(G)] is fed to the inputs of two filters; low pass filter 132 and high pass filter 136. Low pass filter 132, comprising series connected resistor 133 followed by capacitor 134 connected between one end of the resistor and ground 140, is adjusted so that its cutoff point falls in frequency between the frequency of the very slow variation in wall thickness and the frequency of the flaw-indicating dips. This filter, therefore, passes only the D.C., or substantially D.C., information as to the wall thickness. This D.C. portion of the signal is passed through amplifier 145, series-connected resistor 146, and is developed across summing resistor 148.

High pass filter 136, comprising series-connected capacitor 137, and resistor 138 connected between capacitor 137 and ground 140, is so designed that it passes only the relatively high frequency flaw-indicating pulses and rejects the substantially D.C. portion of the signal. The flaw-indicating pulses, containing information as to the location and depth of every flaw existing in pipe wall 112, then appear at the signal input 155 of transmission gate circuit 149.

It is the function of the magnetic inspection system, the output of which appears upon the control input 157 of transmission gate 149, to selectively pass only those flaw-indicating pulses from the ultrasonic inspection system that provide information concerning pits, and to reject all other flaw-indicating pulses. The magnetic inspection system provides an output pulse, as shown in waveform 1(D), corresponding to each and every pit, no such pulse corresponding to inclusions or laminations. Each such output pulse from the magnetic system, fed to control input 157 of transmission gate 149, enables the gate and causes it to pass the particular flaw-indicating pulse from the ultrasonic system which corresponds to the enabling pulses in time. Pulses fed through the transmission gate are fed through series-connected resistor 146 and developed across summing resistor 148.

There is developed across the summing resistor, then, both the D.C., or substantially D.C., signal of wall thickness, as well as those flaw-indicating pulses which provide information as to the location and depth of pits. This sum signal is fed through amplifier 150 to an indicating device shown schematically as a meter 151, but which of course may be any suitable type of indicating or recording apparatus. Indicating device 151 then provides an indication of both the thickness of the pipe wall and the location and depth of any pits appearing therein.

Instead of combining, or summing, these two components of the output signal across summing resistor 148 and feed them to a single recording or indicating instrument, each of the components may be fed to a separate recording or indicating instrument. For instance, the D.C. output of amplifier 145 may be fed to a pen-type recorder 200 shown in dashed lines; and the flaw-indicating output of transmission gate 149 may be fed to another pen-type recorder 201 also shown in dashed lines.

While any conventional ultrasonic inspection system would be suitable for use in this apparatus, the preferred ultrasonic inspection system 120 shown and described herein is a more sophisticated pulse type system which itself forms the basis of a separate patent application Serial No. 172,677, filed February 12, 1962, by Fenton M. Wood and Noel B. Proctor. This system, as shown in FIG. 1, comprises a single crystal transceiving transducer 2, a pulse echo console 1 and a recording adapter 40, the latter two comprising the principal components of the system, followed by a phase inverter 130. Transceiving transducer 2 may be a conventional piezoelectric crystal transmitting a pressure pulse radially through a coupling medium, such as a liquid, into pipe wall 112 through the outer surface 118.

Figure 6:
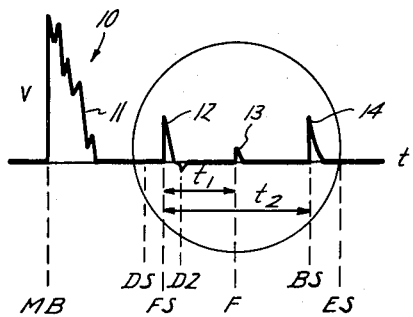
FIG. 6 shows the waveform of the video output signal furnished by the pulse echo console of FIG. 3.

Before considering the circuitry of the ultrasonic system in any detail, it is useful to consider the nature of the electrical signal which is transmitted from the transceiving transducer to the receiving system. A typical waveform 10 of this electrical signal is shown in FIG. 1(F) and in more detail in FIG. 6, being displayed in both figures along a time abscissa. The first part of waveform 10 comprises the output response of the crystal to the transmitted pulse, or main bang (MB) 11. The transmitted pulse is not transmitted completely into pipe wall 112, and a portion of it is reflected from outer surface 18, resulting in the front surface (FS) pulse 12 on the waveform. If the transmitted pulse encounters a flaw, there results a flaw (F) pulse 13 in the waveform. A portion of the pulse is also reflected from the inner, or back surface 116, resulting in back surface (BS) pulse 14.

FIG. 3 shows transducer 2 and a detailed block diagram breakdown of pulse echo console 1. The pulse echo console comprises a radio frequency (RF) detection channel 3, a transducer pulse control channel 4, a delay sync generating channel 5, and an indicator circuit 6.

The RF detection channel 3 and the transducer pulse control channel 4 are conventional. A timing pulse generator 7 of conventional design continuously produces a periodic sequency of uniformly shaped rectangular pulses, shown as waveform 3(A). This output waveform is fed to a conventional differentiator 8 that converts each rectangular pulse into a sharp trigger pulse 3(B). Each trigger pulse 3(B) is coupled to pulse generator 9 of conventional construction that produces a corresponding high voltage pulse 3(C) to excite transducer 2.

Transducer 2, when excited by high voltage pulse 3(C), transmits a pulse of energy at its natural RF frequency. Reflections of the transmitted ultrasonic pulse, as converted by transducer 2 into electric signals and fed to detection channel 3, comprise modulated waveforms at the same RF frequency as illustrated by waveform 3(D). Reflected pulses are amplified and heterodyned down to an IF frequency in RF amplifier and mixer 16. The resulting IF frequency signal is then amplified by one or more stages of IF amplification in amplifier 17. Detector 18 demodulates the signal by removing the IF carrier, leaving only the envelope. The resulting video signal is amplified in video amplifier 19 and then fed to differentiator 20, wherein each of the pulses is differentiated as illustrated by waveform 3(F) to have a sharp leading edge 21 that corresponds to the beginning of the pulse. The output from differentiator 20 is fed through a pulse amplifier 22, appears at video output 15, and is also coupled through amplifier 33 to the vertical deflection plates 23 of a cathode ray tube (CRT) 24 in indicator circuit 6.

Delay sync generating channel 5 provides the control for cathode ray tube 24. Rectangular timing pulses 3(A) from timing pulse generator 7 are fed to variable delay circuit 25, which delays the pulses by an amount that is adjustable by the operator of the equipment. Each of the resulting delayed rectangular pulses is fed to differentiator 26, which operates in an identical manner to differentiator 8 already discussed to alter each rectangular pulse in waveform 3(G) at the output of variable delay circuit 25 to the form shown in waveform 3(H) at the output of the differentiating unit. The leading edge of each differentiated pulse corresponds the beginning of each rectangular pulse in waveform 3(G) and therefore the leading edge of each delayed, differentiated pulse 3(H) is delayed a predetermined amount of time behind the leading edge of corresponding pulse 3(B) at the output of differentiator 8, which initiates pulse 3(C) in pulse generator 9. These delayed pulses 3(H) are fed through amplifier 27, and from the output of this amplifier to a delay sync output terminal 28 (waveform 3(L)) and to the input of unblanking generator 29.

Unblanking generator 29, as its name indicates, supplies an unblanking pulse 3(J) to grid 30 of CRT 24. Unblanking generator 29 is also connected to horizontal sweep generator 31, and the initiation of unblanking pulse 3(J) also initiates the start of a sawtooth sweep waveform 3(K) from the output of the horizontal sweep generator. This sweep sawtooth is applied from the output of sweep generator 31 to horizontal deflection plates 32 of CRT 24. The purpose of the delay sync channel is to remove the transmitted pulse (or main bang) from the presentation displayed on CRT 24. Since unblanking pulse 3(J) unblanks the CRT to permit signal presentation on its face only during a period which starts after the occurrence of main bang pulse 11, and since sawtooth sweep 3(K) commences only after the occurrence of main bang pulse 11, that unwanted pulse will not be displayed upon the CRT face. Looking at FIG. 6, while the total wavetrain 10 displayed thereon includes main bang pulse 11, the effect of the delay sync channel is to limit the portion of this wavetrain displayed on the CRT face to that portion enclosed within the circle on FIG. 6.

The extent of the delay in variable delay circuit 25 is preferably adjusted by the operator of the equipment while viewing the presentation on the face of CRT 24; and the delay is adjusted until no part of the main bang 11 appears on the face of the CRT, but front surface pulse 12 does appear there. The duration of sweep sawtooth 3(K) is designed so that the sweep on the CRT face will be sufficiently long to permit both front surface pulses 12 and back surface pulses 14 to be displayed thereon.

All of the circuits represented by the various block in FIG. 3 are of conventional design, and many well-known and frequently used circuits are in existence which will satisfactorily perform these functions.

The important information contained in pulse train 10, as it appears at video output 15 of pulse echo console 1, is the distance of the flaw pulse 13 from either front surface pulse 12 (comprising time differential $t_1$) or from the flaw pulse 13 to back surface pulse 14 (comprising time differential $t_2-t_1$). The function of the recording adapter is to analyze this pulse train, or more properly to analyze the sequence of many pulse trains, and to present this important information in a useful manner. The recording adapter receives both the video signal and the delay sync output signal from the pulse echo console. It uses the delay sync signal to remove the main bang pulse from consideration, in a manner similar to that in which this delay sync pulse was used to remove the main bang pulse from the presentation on the face of CRT 24 in the pulse echo console.

The recording adapter initiates a first control signal simultaneously with the leading edge of front surface pulse 12. It initiates a second control signal simultaneously with the leading edge of the next appearing pulse. This next appearing pulse will be flaw pulse 13 if the ultrasonic system is then interrogating a region in which there is a flaw; it will be back surface pulse 14 if the interrogated region does not contain a flaw. The recording adapter then generates, for each pulse train 10, a rectangular pulse having a constant amplitude and a width equal to the distance (or time differential) between the start of the first and second control signals. Since each pulse train 10 will have a corresponding constant amplitude pulse, the results of a succession of pulse trains will be a succession of constant amplitude rectangular pulses, differing only by their widths. These pulses are then integrated by the recording adapter to provide a continuous electrical signal having an amplitude representative of the distance between the front and back surfaces (thickness of the wall) in those regions in which there is no flaw, and representative of the depth of a flaw (the distance between the front surface pulse 12 and flaw pulse 13) in those regions where a flaw exists.

A detailed block diagram of the recording adapter is shown in FIG. 4. The waveforms appearing at various points in the block diagram of FIG. 4 are shown in FIG. 5; the particular waveforms are keyed to their appropriate point in the block diagram by the lower case letters which identify each waveform and which appear at the appropriate point in the block diagram. All of the waveforms, with the exception of the integrator output 5(k), are presented upon a common time axis.

There are two inputs to the recording adapter from the pulse echo console. The video output from line 15 of the pulse echo console is fed to the video input terminal 50 of the recording adapter, as shown in FIG. 4. This video input comprises a waveform typically shown as 5(d). The other input from the pulse echo console is the delay sync pulse, the waveform of which is shown in 5(a), which is fed from delay sync output terminal 28 of the pulse echo console as shown in FIG. 3 to the delay sync input terminal in the upper left-hand corner of FIG. 4.

This delay sync pulse is fed to the input 41 of a control pulse generator 42. The delay sync pulse triggers the control pulse generator so that it provides at its output 43 a rectangular pulse 5(b). This pulse is initiated simultaneously with the leading edge of the delay sync pulse 5(a) and therefore the control pulse commences at a time between the end of the main bang pulse 11 and the commencement of the front surface pulse 12. This relationship may be seen by comparing the leading edge of control pulse 5(b) with the video pulse train as displayed in FIG. 5(d). The control pulse generator, which may advantageously be any conventional type of monostable multivibrator, or a phantastron generator, is adjusted so that the width of the control pulse output is sufficient so that it is terminated after back surface pulse 14 but before the occurrence of the next main bang pulse 11.

The control pulse comprising the output of control pulse generator 42 is fed through cathode follower 44 to the inputs of several circuits. Cathode follower 44 may be of any conventional design, such as preferred circuit 43 described in "Handbook of Preferred Circuits— Navy Aeronautical Electronics Equipment," prepared by the National Bureau of Standards, Department of Commerce, for the Bureau of Aeronautics, Department of Navy, identified as NAVAER 16-1-519, published September 1, 1955, and available through the Superintendent of Documents, United States Government Printing Office, Washington 25, D.C. (This reference will be referred to hereinafter as HPC and the particular circuit number in the text to which reference is made will follow the abbreviated title.)

The output of cathode follower 44 is fed through a conventional attenuator 45 to one input 46 of a coincidence circuit 47. The purpose of the conventional attenuator is to provide sufficient attenuation of the signal to compensate for the additional delay circuit 48 and gated cathode follower 53 which appear in the input circuit to the other coincidence circuit 54. The necessity of equalizing the inputs to the two coincidence circuits will be evident after the description of both circuits is complete. The other input 51 of coincidence circuit 47 receives the video signal from video input terminal 50. Coincidence circuit 47 may be of any conventional type well known in the art, such as those illustrated, for instance, on pages 397 to 400, inclusive of Pulse and Digital Circuits by Millman and Taub, published by McGraw-Hill, 1956. These circuits are known also as "AND" circuits, and provide an output signal only while input signals are being simultaneously received on both inputs. The output of coincidence circuit 47 is negative in polarity, and since the control pulse which is fed to input 46 does not commence until after the occurrence of the main bang, the coincidence circuit, as shown in waveform 5(e) has an output corresponding to each and every pulse in the video waveform after the main bang.

The output of coincidence circuit 47 is fed to the SET input 55 of flip-flop 56. Flip-flop 56 has a RESET input 60 which receives a RESET pulse 5(l) from delay circuit 100, which is in turn fed by the control pulse output from control pulse generator 42. Flip-flop 56 provides an output on lead 61. This flip-flop may be of any conventional type which is triggered into one of two bistable states in which it provides a positive voltage output upon receipt of a negative trigger upon the SET input 55, and which subsequently returns to its original state upon receipt of a positive pulse input on RESET input 60. Once a negative SET trigger has been received on input 55, subsequent negative input pulses received on SET input 55 after the initial trigger will not affect the state of the FF, and similarly any subsequent positive triggers which might be received upon RESET input 60 subsequent to the initial positive RESET trigger will not affect the state of the circuit. Delay circuit 100 may be any conventional type of pulse producing circuit which incorporates a time delay between its input and its output pulse. It is triggered by a control pulse from control pulse generator 42 and after a suitable delay provides RESET pulse 5(l). The delay incorporated in the circuit is sufficient to place RESET pulse 5(l) at a point in time behind the receipt of the back surface pulse from the inner surface of the pipe.

Examining the operation of FF 56, then, we see that it is triggered into its positive-voltage-output state by the leading edge of the first negative pulse in the output of coincidence circuit 47, which output is shown in 5(e). The FF remains in the state, with a positive voltage output and is not affected by the subsequent negative pulses appearing in the output of coincidence circuit 47. The FF is finally returned to its initial RESET state at some time after the receipt of the back surface pulse by RESET pulse 5(l). The waveform at the output 61 of FF 56 is shown in FIG. 5(g).

Another series of circuits, comprising delay circuit 48, gated cathode follower 53, coincidence circuit 54, and FF 59, is used to generate waveform 5(h), the time differential between the leading edge of waveform 5(g) and 5(h) providing a measure of either wall thickness or the depth of a flaw in the pipe wall. The control pulse from the output of control pulse generator 42 and cathode follower 44 is fed to the input of delay circuit 48, which may be of any conventional type. This delay circuit delays the control pulse sufficiently so that its leading edge, after delay, occurs at a point in time subsequent to the appearance of the front surface echo pulse. This time relationship may be seen by comparing the pulse 5(c) appearing at the output of delay circuit 48 with the video pulse train shown in 5(d).

This output of delay circuit 48 is fed to one input of gated cathode follower 53. The video pulse train from the video input terminal 50 is fed to the other input of the gated cathode follower. Gated cathode follower 53 comprises essentially a coincidence, or AND, circuit similar to coincidence circuit 47. It provides an output whenever it is receiving signals simultaneously on each of its two inputs. Since it is not receiving a signal on input 49 at the time of the receipt of the front surface pulse on input 52, its output will contain pulses corresponding only to the flaw and back surface video pulses. These pulses are fed to one input 35 of coincidence circuit 54, which is similar to coincidence circuit 47 already described. The control pulse is fed to the other input 101 of coincidence circuit 54, and the output of the coincidence circuit will be the series of negative going pulse shown in FIG. 5(f). This output is fed to the SET input 57 of FF 59. The RESET input 62 of the FF receives the RESET pulse from delay circuit 100, and FF 59, which is identical to FF 56 already described except that its output is reversed in polarity, provides an output on lead 63 which is shown in FIG. 5(h). It will be seen that the leading edge of this output is initiated by the leading edge of the first of the two negative going pulses in the output of coincidence circuit 54, and the end of the negative going FF output pulse is determined by RESET pulse 5(l).

We have then on output leads 61 and 63 from the two FF's signals having waveforms shown in 5(g) and 5(h), respectively. The leading edges of these rectangular pulses are determined by the leading edges of the front surface return, and either the flaw or back surface return, respectively. If the distance between these two leading edges is measured (or the elapsed time between these two leading edges, which is the same thing), the result with be representative of either the depth of a wall if there is no flaw therein.

flaw existing in the pipe wall or the thickness of the pipe
Outputs 61 and 63 of the two FF's are fed to inputs 64 and 66, respectively, of gated cathode follower 65.

This gated cathode follower is a circuit which provides a positive output only when there is a positive voltage existing upon both of its inputs. This means that, in order for there to be a positive output voltage on output 67 of the cathode follower, the positive rectangular pulse 5(g) must be applied to input 64 and the negative rectangular pulse 5(h) must not be applied to input 66. The resulting output 5(i) has a width which is equal to the distance between the leading edges of the two FF outputs, or, in other words, the width of output 5(i) is proportional to the depth of a flaw, if a flaw exists in the region then being interrogated, or to the thickness of the pipe wall, if there is no flaw in the region.

The output of gated cathode follower 65 is applied to the input of a shaping circuit 68 which renders the somewhat ragged pulse output of the gated cathode follower into a rectangular pulse having a level top of constant voltage. The width of the pulse is maintained the same, naturally, since the pulse width contains the desired information. The output of shaping circuit 68 is shown on FIG. 5(j).

For each video pulse train 10, then, resulting from each transmitted pulse, there corresponds a pulse 5(j), providing by its width an indication of the depth of flaw or thickness of wall at that particular region as indicated by reflections from that particularly transmitted pulse. Consecutive pulses 5(j) corresponding to successive transmitted pulses, are all of equal amplitude, but vary in width according to variations in wall thickness or to the appearance of the flaws. This succession of pulses 5(j) is fed to the input of integrator 95 which provides at its output a signal 5(k) which is a continuous signal having a value at any instant proportional to the integral of successive pulses 5(j). This waveform of 5(k) is the only waveform in FIG. 5 which is not on a common time axis; the time axis of the integrator output waveform is highly compressed, since the dip in the integrator waveform, indicative of the existence of a flaw, is not the result of integration of only one pulse 5(j), but of many such pulses as the interrogating transducer moves over the surface of the pipe.

The output signal of integrator 95 is therefore seen to be proportional to the time differential between receipt of surface pulse 12 and the next occurring pulse, whether it be a defect echo pulse 13 or a back surface echo pulse 14. If transducer 2 should be held stationary on pipe 111, the output of system 120 would be a constant signal, the result of the integration by integrator 95 of the repetitive series of equal width pulses from the output of gated cathode follower 65. As transducer 2 is scanned slowly (relative to the repetition rate of the transmitted pulses) along the surface of pipe 111 in an axial direction, the output signal is also constant (D.C.) as long as there are no anomalies or flaws in the pipe and the pipe wall thickness remains constant. Variations in the pipe wall thickness cause the output signal to vary very slowly in amplitude. The presence of a defect or flaw of any type results in a more rapid fluctuation (dip) in signal amplitude, with the bottom of the dip representing the depth of the defect from the front surface.

The output signal then contains in its constant or slowly varying D.C. component information as to the average pipe wall thickness (the amplitude of the signal being directly proportional to wall thickness), and in its relatively sharp decay or dip information as to the location and depth of defects or flaws in the pipe, with the amplitude of the "bottom" of the dip being directly proportional to the depth of the flaw. The "slowness" of the signal amplitude variation due to changes in wall thickness and the "rapidity" of fluctuations due to defects or flaws are both, of course, relative to the scanning speed of the transducer along the surface of pipe 111.

The output of integrator 95 is fed through conventional cathode follower 96 and to terminal 97 comprising the output of recording adapter 40, and from which the signal is coupled to phase inverter 130 (FIG. 1). The phase inverter may be any conventional circuit well known in the art used for performing this function, and its output, as seen in FIG. 1 and as mentioned previously, is fed both to low pass filter 132 and high pass filter 136.

To facilitate setting of the appropriate delay in delay circuit 48, a calibrating circuit is connected to the recording adapter to place a calibrating pulse on the face of CRT 24. The calibrating circuit 105 is connected from the output of delay circuit 48 through a conventional differentiator and cathode follower 106 which provides at its output a sharp calibrating spike. This output, appearing upon the calibration terminal in FIG. 4, is subsequently inverted in phase by a phase inverter (not shown) and then applied to the vertical plates of CRT 24. It produces a negative pulse $D_2$, shown in FIG. 6, which, when delay circuit 48 is appropriately adjusted, appears just subsequent to the front surface (FS) pulse 12. The delay in circuit 48 is adjusted until this desired relationship is achieved, thus providing a convenient way for positioning the pulse train on the CRT face.

Figure 7:
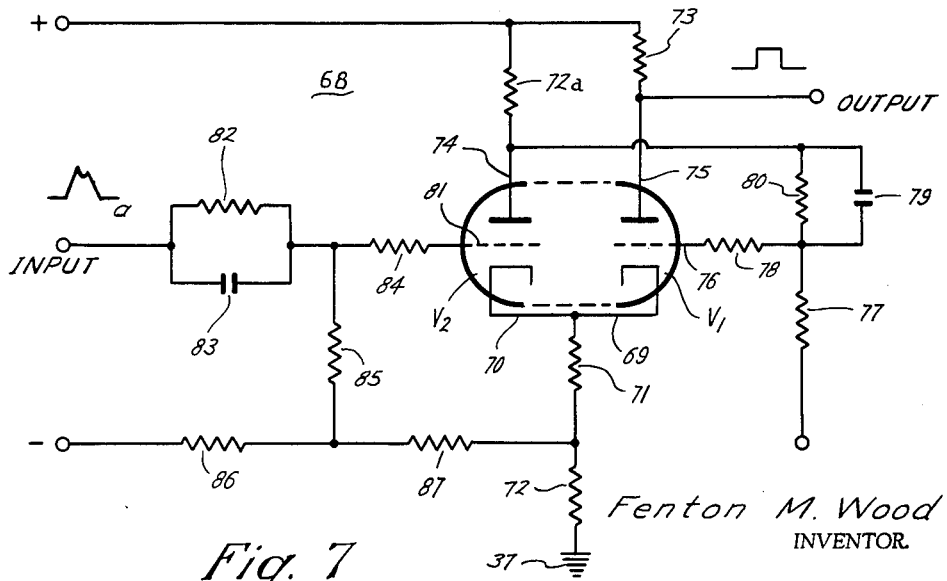
FIG. 7 is a schematic diagram of a typical pulse squaring circuit suitable for use in the recording adapted shown in FIG. 4.

All of the circuits represented by blocks in FIG. 4 are conventional, with the possible exception of shaping circuit 68. A shaping circuit suitable for use with this system is shown schematically in FIG. 7 This circuit includes a dual triode tube having sections $V_1$ and $V_2$. Cathodes 69 and 70 are connected and coupled to ground 37 through series resistors 71 and 72. A positive D.C. operating voltage is coupled through resistor 72a to plate 74 of section $V_2$ and through resistor 73 to plate 75 of section $V_1$. A negative bias voltage is applied to the grid 76 of section $V_1$ through series resistors 77 and 78, and a network comprising capacitor 79 and resistor 80 connected in parallel is coupled between plate 74 of section $V_2$ and the junction between series resistors 77 and 78. The input to the pulse shaping circuit is coupled to grid 81 of section $V_2$ through a network comprising parallel connected resistor 82 and capacitor 83, with one end of the parallel combination being connected to the junction point between resistors 84 and 85. The other end of resistor 84 is connected to grid 81 of section $V_2$ and the other end of resistor 85 is connected to the junction between series connected resistors 86 and 87. The other end of resistor 86 is connected to a terminal for the insertion of negative bias to section $V_1$, and the other end of resistor 87 is connected to the junction between series connected cathode resistors 71 and 72.

In operation, the negative bias supplied to the grid 81 of $V_2$ from the bias divider comprising resistors 86 and 87 is sufficient to hold section $V_2$ cut off in the absence of input signal. The resulting high plate voltage on plate 74 of section $V_2$ is coupled through the resistor network to grid 76 of section $V_1$ and places grid 76 at nearly zero voltage. Section $V_1$ is therefore fully conductive, providing low plate voltage at the output terminal connected to plate 75. When a positive pulse (a) is fed to the grid of $V_2$ through the network of resistor 82 and capacitor 83, $V_2$ is rendered conductive and the grid of $V_1$ is driven negative, cutting off section $V_1$. This action causes the plate voltage of $V_1$ to increase. At the trailing edge of incoming pulse (a), the grid of $V_2$ is driven in a negative direction, in turn driving the plate of $V_1$ negative. Since $V_1$ is operated between cutoff and saturation, a pulse is produced at the plate of $V_1$ which has a very sharp rise in fall time and is essentially a rectangular or flat top pulse. The leading and trailing edges of the input waveforms correspond in turn to the leading and trailing edges of output waveform in time relationship. Thus, there appears at the output terminal a pulse having a uniform amplitude, determined by the circuit parameters, and having the precise width of the input pulse from gated cathode follower 65.

Suitable types of integrators for performing the function of integrator 95 are described in the text Millimicrosecond Pulse Techniques, by Lewis and Wells, Pergamon Press, London, 1954, page 272.

Magnetic inspection system 121 is conventional. A detecting coil 162 arranged with its longest dimension in a radial direction, operates in synchronism with ultrasonic transducer 2 to inspect pipe 111. As coil 162 is moved axially along the pipe surface 118, it detects any substantial portions of axially directed magnetic flux 160 that have been deflected toward surface 118 by a flaw having a substantial dimension in a radial direction. As mentioned before, flaws such as inclusion 114, that do not have a substantial dimension in the radial direction do not deflect a substantial portion of flux 160 toward surface 118, and are not therefore indicated by the magnetic detection system.

The output of coil 162 is fed through conventional amplifier 165, at the output of which a flaw, such as pit 113, will result in a waveform such as shown in FIG. 1(A). This signal is rectified in bridge rectifier 166, of conventional design, to produce a waveform shown in FIG. 1(B). The output of the bridge rectifier is fed to the input of a conventionally constructed integrator 167 where the unipolar pulses of the FIG. 1(B) waveform are integrated to produce a signal having a waveform similar to that shown in FIG. 1(C) at the output of integrator 167. This integrated signal is fed into pulse shaper 168, which may be identical to shaping circuit 68 described in detail and shown in FIG. 7, to produce at its output a flat top, or rectangular, waveform shown in FIG. 1(D) having a width equal to the width of the input pulse. This waveform 1(D) is applied to the control input 157 of transmission gate 149 and permits that gate, as described previously, to pass whatever signal appears on signal input 155 during the existence of the rectangular signal on the control input. The D.C. magnetic inspection systems shown and described in U.S. Patent No. 2,746,012 to Glenn Price, and in U.S. Patent No. 2,650,344 to Donald Lloyd, are suitable for use as the magnetic inspection system 121 of this device.

Transmission gate 149 operates in a conventional manner and there are numerous well-known types of such gates which would be suitable for use in this system. Reference is made particularly to the previously mentioned text, Pulse and Digital Circuits, chapter 14, entitled "Transmission Gates," and particularly beginning at page 431 for a unidirectional diode gate and beginning at page 437 for multielement tube gates.

The operation of the output signal from the magnetic inspection system in selectively passing flaw indications from the ultrasonic system may be seen more clearly by comparing the waveform shown in FIG. 1(D) at the output of the magnetic system with the output waveform shown in FIG. 1(G) of the ultrasonic system on a common time axis, this comparison being facilitated by the vertical dash lines connecting the two waveforms. It would be observed that a rectangular pulse appears in the magnetic system output at the same time as the flaw signal in the ultrasonic system output that corresponds to pit 113 (that is the flaw signal corresponding to dotted line H in waveform 1(K)). Thus, the high frequency transient pulse from the output of the ultrasonic system, containing information as to the depth of pits 113 is transmitted through transmission gate 149 to indicator 151 because it corresponds in time with an enabling pulse from the magnetic system output. On the other hand, however, there is no enabling pulse in the magnetic system output corresponding to the transient pulse in the ultrasonic system output resulting from inclusion 114, since this inclusion was not picked up by the magnetic system. Therefore, this transient pulse from the ultrasonic system output (shown opposite dotted line J in FIG. 1(K)) is not transmitted through the gate to the indicator. There will be developed across load resistor 148, therefore, and introduced to indicator 151, a composite signal comprising the substantially D.C. portion of the ultrasonic system output, the amplitude of which provides a measure of the pipe wall thickness, combined with the relatively high frequency fluctuations from the ultrasonic system output that correspond to flaws having a substantial dimension in the radial direction, and the amplitude of the peak or bottom of which (depending upon their polarity) provides a measure of the depth of the pits.

Systems other than the magnetic detection system 121 shown and described may be used to distinguish between flaws or anomalies of various types and to selectively channel the corresponding information from the ultrasonic system output to an indicating device or some other utilization means.

Various modifications and alterations to the embodiments described herein, such as will occur to those skilled in the art, are intended to be within the scope of the present invention, which is limited only by the appended claims.

What is claimed is:

1. A method of inspecting a test object for pits and internal defects, comprising the steps of,
   inspecting a portion of a test object with ultrasonic energy by generating an ultrasonic pulse and producing a first electrical signal that varies with the time relation of the front surface echo pulse to a subsequent echo pulse from the test object;
   magnetizing said portion of said test object with a D.C. magnetic field;
   detecting the magnetic flux at the surface of said portion of the test object transverse to the direction of magnetization to produce a second electrical signal representative only of defects having a substantial dimension transverse to said magnetic flux; and
   selectively controlling an electrical indicating device with said second signal to obtain from said first signal information with respect to only those defects having a substantial dimension transverse to said magnetic flux.

2. An inspection apparatus for a test object, comprising,
   ultrasonic means for producing a first electrical signal responsive to all defects in a test object;
   indicating means; and
   magnetic means for producing a second electrical signal responsive to selected defects of the test object; and
   means to selectively couple said first electrical signal to said indicating means in response to said second electrical signal.

3. An inspection apparatus for the location of defects in a test object, comprising,
   means for inspecting an area of a test object with ultrasonic energy and producing an electrical signal containing information from echo energy from all defects in said object;
   indication means; and
   means for inspecting said area of a test object with a magnetic field and producing a second electrical signal responsive only to selective defects in said test area, and
   means for selectively coupling said first electrical signal to said indicating means in response to said second electrical signal.

4. An inspection apparatus for locating and measuring the depth of pits in a test object; comprising,
   means for establishing relative motion between an ultrasonic system and a test object and inspecting a portion of said test object with ultrasonic energy by generation of an ultrasonic pulse and producing a first electrical signal proportional to the time relation between the front surface echo pulse and a subsequent echo pulse;
   said ultrasonic signal having a D.C. component proportional to the average thickness of the test portion and a transient component resulting from defects;

means for establishing relative motion between another inspection system and said test object and inspecting said test portion for only a particular type of defect and producing a second electrical signal indicative of such a defect;

indicating means;

means for selectively coupling portions of the transient component of said first signal to said indicating means in response to said second signal.

5. The inspection apparatus, as described in claim 4, wherein, said another inspection system utilizes a magnetic field to locate defects having a particular orientation.

6. The inspecting apparatus, as described in claim 4, wherein, said another inspection system utilizes a magnetic field.

7. The inspection apparatus, as described in claim 6, wherein, said another inspection system comprises, means for magnetizing said test portion with a D.C. magnetic field, and means for detecting the magnetic flux at the surface of said test portion transverse to the direction of magnetization and producing an electrical signal indicating the existence of a defect having a substantial dimension transverse to the direction of magnetization.

8. The inspection apparatus, as described in claim 4, wherein, said coupling means comprises a first channel for selectively transmitting said first signal transient component to said indication means and a second channel for continuously transmitting said first signal D.C. component to the indication means.

9. The inspection apparatus, as described in claim 8, wherein, said first channel comprises high pass electrical filter means; and said second channel comprises low pass electrical filter means.

10. An inspection apparatus for locating and measuring the depth of selected defects in a test object, comprising, means for establishing relative motion between an ultrasonic inspection system and a test object and inspecting a portion of said test object with ultrasonic energy by generation of an ultrasonic pulse for producing an electrical signal proportional to the time relation between the front surface echo pulse and the next following echo pulse;

said electrical signal having a D.C. component proportional to the average thickness of the test portion and a transient component indicative of defects in said test object;

means for receiving said ultrasonic signal and separating said transient component from said D.C. component.

11. An inspecting apparatus, as described in claim 10, wherein, said separation means comprises high pass electrical filter means coupled to receive said electrical signal and having an output representing said transient component.

12. An inspection apparatus, as described in claim 10, wherein, said separation means comprises low pass electrical filter means for receiving said electrical signal and having an output representing said D.C. component.

13. An inspection apparatus, as described in claim 10, wherein, said separation means comprises low pass electrical filter means for receiving said electrical signal and having an output representing said D.C. component, and high pass electrical filter means for receiving said electrical signal and having an output representing said transient component;

load means coupled to the outputs of said high pass and low pass filter means outputs for electrically adding the outputs of said filter means to produce a time varying electrical signal; and means interposed between said high pass filter means and said load means for selectively connecting the output of said high pass filter means to said load means in response to an external control signal.

No references is cited.

LEO SMILOW, *Primary Examiner.*